(12) United States Patent
Venkataraman et al.

(10) Patent No.: US 9,064,291 B2
(45) Date of Patent: Jun. 23, 2015

(54) KNOWLEDGE SYSTEM DISSEMINATING A MEDIUM TO USERS AND MODIFYING IT BASED ON USER FEEDBACK

(75) Inventors: Arun Venkataraman, Tamilnadu (IN); Ashwini Suryanarayana, Karnataka (IN); Srinivasan Adinarayanan, Tamilnadu (IN); Dileep Ramakrishna, Karnataka (IN); Cynthia Nimija, Tamilnadu (IN)

(73) Assignee: Tata Consultancy Services Limited, Mumbai (IN)

( * ) Notice: Subject to any disclaimer, the term of this patent is extended or adjusted under 35 U.S.C. 154(b) by 362 days.

(21) Appl. No.: 13/216,421

(22) Filed: Aug. 24, 2011

(65) Prior Publication Data

US 2012/0054644 A1    Mar. 1, 2012

(30) Foreign Application Priority Data

Aug. 24, 2010   (IN) .......................... 2364/MUM/2010

(51) Int. Cl.
| | |
|---|---|
| *G06F 3/00* | (2006.01) |
| *G06Q 50/20* | (2012.01) |
| *G09B 5/00* | (2006.01) |
| *G06F 9/44* | (2006.01) |
| *G06F 3/0481* | (2013.01) |

(52) U.S. Cl.
CPC .............. *G06Q 50/20* (2013.01); *G06F 9/4446* (2013.01); *G06F 3/0481* (2013.01); *G09B 5/00* (2013.01)

(58) Field of Classification Search
CPC ..... G06F 9/4446; G06F 3/0481; G06Q 10/10; G06Q 50/20; G09B 5/00
USPC .......................................... 715/733, 745, 751
See application file for complete search history.

(56) References Cited

U.S. PATENT DOCUMENTS

| | | | | |
|---|---|---|---|---|
| 6,773,266 | B1 * | 8/2004 | Dornbush et al. | 434/322 |
| 2008/0038708 | A1 * | 2/2008 | Slivka et al. | 434/350 |
| 2009/0042175 | A1 * | 2/2009 | Zorba et al. | 434/323 |
| 2009/0248505 | A1 * | 10/2009 | Finkelstein et al. | 705/14 |
| 2011/0296304 | A1 * | 12/2011 | Kempe | 715/708 |
| 2013/0067348 | A1 * | 3/2013 | Kast | 715/747 |

* cited by examiner

*Primary Examiner* — Kieu Vu
*Assistant Examiner* — Aaron Lowenberger
(74) *Attorney, Agent, or Firm* — Lee & Hayes, PLLC

(57) ABSTRACT

A computer implemented method for disseminating knowledge comprises generating at least one medium based on information associated with at least one participating user. The participating users can be categorized based on their interaction with the mediums. The participating users can further provide a feedback based on which recommendations for modification of content of the mediums are generated. Based at least on the recommending, the knowledge framework is modified.

14 Claims, 3 Drawing Sheets

KNOWLEDGE SYSTEM DISSEMINATING A MEDIUM TO USERS AND MODIFYING IT BASED ON USER FEEDBACK

TECHNICAL FIELD

The present subject matter relates, in general, to the field of knowledge framework and, in particular, to knowledge framework for disseminating knowledge in relation to processes deployed in an organization.

BACKGROUND

With growing competitive conditions in a dynamically changing environment of global economy, organizations have been adopting various business strategies, such as deploying new or pre-existing processes, to improve growth and to sustain performance. Processes, such as business processes, can include any activities or tasks that result in fulfillment of a specific objective. Examples of such processes include competency development processes, induction processes, sales and marketing processes, innovation processes, etc., to name a few.

Typically, within the organization, various knowledge frameworks may be utilized for disseminating knowledge in relation to processes deployed within the organization. Learning management systems implementing such knowledge frameworks digitize information to facilitate learning about processes, thereby enhancing competency of associates. The digitized information can be provided as educational materials, discussion forums, and performance analyses. Proficiency or familiarity with one or more processes can be further assessed based on a series of tests. In such a way, the users within the organization can use such digitized information to enhance as well as assess their knowledge. The nature of such systems and solutions is, generally, formal and similar to a training course.

Conventionally, process deployment within an organization is top-to-bottom, which means that a team may manage the deployment of the process in a formal and hierarchical manner based on information gathered from the knowledge frameworks. This approach of process deployment is generally supplemented by communications and trainings conducted for specific roles in an organization structure. The knowledge in relation to the deployed processes may take a long duration in deployment and is ineffective in disseminating knowledge pertinent to the process to all levels of the organization. Moreover, the number of users in the process may be small, being limited to the number of employees in the organization.

SUMMARY

This summary is provided to introduce concepts related to a knowledge framework for deploying a process over a network, which is further described below in the detailed description. This summary is not intended to identify essential features of the claimed subject matter nor is it intended for use in determining or limiting the scope of the claimed subject matter.

A method for deploying a process over a network comprises generating one or more mediums based on information associated with one or more participating users. The participating users can be categorized based on their interactions with the mediums. The participating users can further provide a feedback based on which recommendations for modification of content of the mediums are generated. Based at least on the recommending, the knowledge framework is modified.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
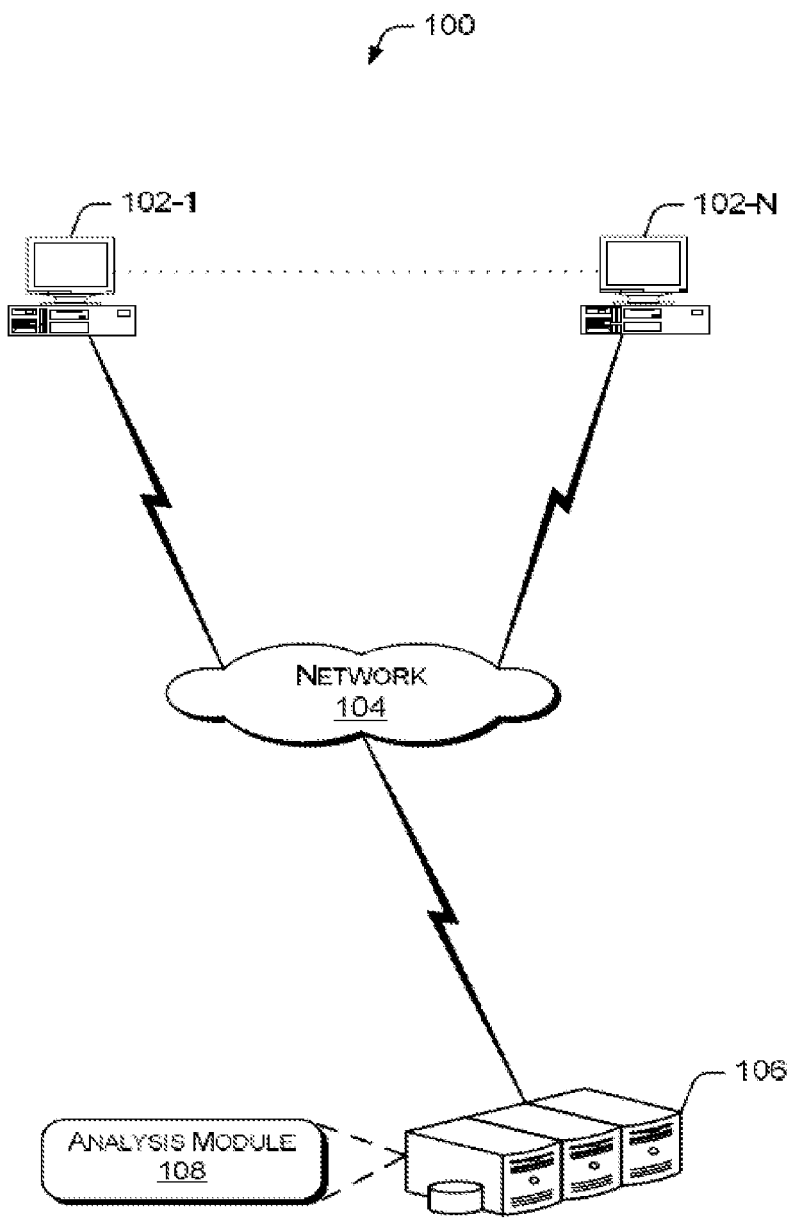
FIG. 1 illustrates an exemplary network environment implementing a knowledge framework, according to an embodiment of the present subject matter.

Devices and methods for implementing a knowledge framework are described herein. Such devices and methods can be implemented in a variety of operating systems. Devices that can implement the described methods include a diversity of computing devices, such as a server, a desktop personal computer, a notebook or a portable computer, a mainframe computer, a mobile computing device and an entertainment device.

In an organization, various processes need to be deployed for enhancing growth of the organization and improving the competency level of the employees. Processes that may be deployed may relate to competency development, marketing and communication, induction, talent management, innovation management, etc. Conventionally, process deployment in organizations is driven top-to-bottom. In such a top-to-bottom approach, a team, which may be referred to as a process team, is assigned the task of the process deployment. The process team manages the deployment of the process in a formal and hierarchical manner by using one or more knowledge frameworks.

A knowledge framework can be considered to be a framework, which provides various tools or mechanisms for identifying, creating, distributing, enabling adoption of and disseminating knowledge. Such tools can include various mediums through which knowledge can be disseminated. The mediums can be in written or visual formats, such as tutorials, manuals, presentations, quizzes, assessment tests, recorded lectures, etc. The process team in such cases can create and configure the mediums, say by making changes to the content within the technical manual or questions of one or more quizzes. The contents for the different types of mediums can be stored in a knowledge bank or database.

The different mediums within the knowledge framework may be configured according to various parameters, such as number of users, identities of the users, type and/or number of questions, topic, complexity, users' performance, to name a few. The knowledge framework for process deployment may be part of a learning management system. A learning management system typically includes services/modules to digitize the learning processes. For example, a learning management system may facilitate registration of learners, assignment of learning activities, allowing access to learning content, evaluation of knowledge level, etc., in relation to one or more processes that have been deployed in an organization.

Conventionally, the knowledge frameworks are configured without any input or involvement from the participating users. In such cases, the members of the process team can configure which users have to be invited to interact or participate with the knowledge framework. For example, the process team through the knowledge framework may invite one or more users to take a quiz. In such cases, the number and variety of the users that can be involved are limited. Moreover, the quizzes provided to each of the users may be same irrespective of their profile or their specific preferences. These systems can therefore be considered to function in a closed environment, as further knowledge dissemination would be dependent on the process team. Furthermore, such systems may be agnostic of members' interest to gain knowledge in a certain field. For example, such systems because of their close nature may not allow users to choose the relevant area, such as a process, where they want to gain expertise in. Since these systems are closely controlled by the process team, the knowledge framework being implemented may become rigid in the absence of any changes based on user feedback.

Conventional systems also fail to provide any mechanisms for capturing feedback from the users. Lack of feedback tends to make the knowledge framework inanimate and uninteresting. Furthermore, the conventional knowledge frameworks, or the learning management systems implementing the knowledge frameworks, facilitate little or no interaction among the users, and hence do not facilitate dynamic knowledge generation or dissemination.

To this end, systems and methods for implementing a knowledge framework in an organization for effective process deployment are described. The knowledge framework, in accordance with the present subject matter, can be used to disseminate knowledge in relation to the one or more processes through various mediums, based on the involvement and participation of one or all users in the organization. In an implementation, this is accomplished by combining the concept of knowledge framework with the concept of interaction over a computer network, such as a LAN, WAN, Internet, etc.

In an embodiment, the knowledge framework can be implemented over a network that facilitates interaction among users. The knowledge framework is open for access to one or more users of the organization. The users within the organization can interact with the knowledge framework, or with other users, to obtain or supplement their knowledge, awareness, familiarity, etc., with the processes deployed within the organization. In one implementation, the knowledge framework being implemented can be configured, either partly or wholly, by the users within the organization. The interaction of the users over the network allows wider propagation of concepts related to the deployed processes. Furthermore, the involvement of the users provides extensibility in spreading knowledge in relation to process deployment.

Various mediums are utilized for disseminating knowledge amongst the users within the organization. Examples of such mediums include, but are not limited to, quizzes, assessment tests, tutorials, technical manuals, articles, and such. The users may go through the different types of mediums depending on the level of proficiency that they wish to achieve with respect to a process. It would be appreciated that the knowledge framework can also be implemented for spreading knowledge related to many aspects besides processes already deployed or to be deployed in an organization. For example, the knowledge framework can be implemented for imparting knowledge for learning about various stages of software development. The knowledge frameworks implemented for such aspects would also be included within the scope of the present subject matter.

The mediums for imparting knowledge through the knowledge framework can be designed based on one or more specific themes. For example, the mediums that the users can go through can be either competitive or collaborative. Mediums that are collaborative can be aimed at increasing the awareness amongst one or more participating users in relation to the deployed processes. Such mediums would include tutorial, articles, technical literature, etc. On the other hand, competitive themes based mediums can be aimed at testing the proficiency of the participating users in relation to the deployed processes. Such theme based mediums can be implemented as quizzes, tests, etc. For example, early adopters of a process may involve themselves in obtaining awareness and being mentored through manuals, tutorials, etc. More experienced members can involve themselves in participating or hosting quizzes, promoting quizzes for better visibility, recommending quizzes, discussions, etc.

The knowledge framework can subsequently rate the users based on their performance, such as their score in quizzes taken. The users can also be ranked based on their performance and such ranking can be made to other users as well. This may tend to encourage other users to participate in similar tests in order to increase their proficiency in relation to the processes, and thus achieve a higher rank. Such systems would be open to the users and would enable a faster dissemination of knowledge and information. In one implementation, the knowledge framework can request the participating users to provide feedback. Based on the feedback, the knowledge framework can be configured, for example, content of the mediums can be modified. In such a way, the quality of information being provided through the knowledge framework would increase as more and more users interact with the knowledge framework.

The mediums that are provided to the user can be based on a number of parameters. The knowledge framework can provide different types of mediums such as tests, tutorials, etc., based on the information associated with the user. For example, the knowledge framework can provide a quiz for a user depending on the user's past performance in relation to the topic in concern. For high scoring past performance, the knowledge framework may provide a test with a high difficulty level, as compared to a simpler or lower difficulty level of tests being provided for new participating users or users who may not have scored well in previous quizzes. It would be noted that the quizzes provided to the users would therefore be different for different users. The knowledge framework can either provide the participating users with the different types of mediums, or the different mediums can be suggested to other users by a participating user, for example, a participating user on finding an article beneficial, may refer the article through the knowledge framework to other users within his project group. As would be appreciated, such features provide a broader dissemination of knowledge.

In another implementation, the knowledge framework provides for modifications to the contents of the different types of mediums by the users. For example, experts in a certain field may be allowed to construct or build tests for novices in the field. The modifications to the content can also be based on the feedback provided by the participating users. The knowledge framework can also be configured to provide a platform or a virtual forum through which such feedback can be provided. In one implementation, the users besides providing feedback can provide directions to other users. These and other aspects of the knowledge framework are described in conjunction with the exemplary systems as provided below.

FIG. 1 illustrates an exemplary network environment 100 implementing a knowledge framework, according to an embodiment of the present subject matter. The knowledge framework can be configured for disseminating knowledge in relation to the one or more processes, such as induction processes, competency development processes, change management processes, marketing and communication processes, innovation processes, talent management processes, etc., over the network environment 100. In one implementation, the knowledge framework may be implemented as part of a learning management system. The processes can be deployed across the organization, say in different departments.

The network environment 100 includes a plurality of user devices, such as the user devices 102-1, 102-2, . . . , 102-N, hereinafter collectively referred to as user devices 102. The user devices 102 may include a desktop personal computer, a laptop, a workstation, a mobile phone, a notebook, an entertainment device and the like. The user devices 102 interact over/through a network 104, with a knowledge system 106. The network 104 may be a wireless network, a wired network, or a combination thereof. The network 104 can be a collection of individual networks, interconnected with each other and functioning as a single large network, for example, the Internet or an intranet. The network 104 may be any public or private network, including a local area network (LAN), a wide area network (WAN), a mobile communication network, a direct to home network or a virtual private network (VPN).

The knowledge system 106 can be implemented as one, or a combination of two or more, personal computers, a storage server, a network server, a workstation, etc. The knowledge system 106 hosts components that implement one or more functions of knowledge frameworks for imparting knowledge in relation to the processes either deployed or about to be deployed within an organization. In one implementation, a team of individuals, referred to as a process team, may create and configure the components implementing the knowledge framework in the knowledge system 106 for effective dissemination of knowledge or information pertinent to the deployment of the process. The knowledge within the knowledge framework can be imparted through various mediums that include quizzes, tutorials, brochures, assessments, and any other modes of knowledge dissemination.

The knowledge framework implemented within the knowledge system 106 can benefit one or more units within the organization. For example, the knowledge framework may enhance the efficiency of the human resources team, the operations unit, the team in charge of various business processes, the marketing unit, the sales unit, etc. The knowledge framework is aimed at fostering a learning environment in the organization, nurturing innovation, enhancing the efficiency of the process deployment, helping improve induction of new employees, creating awareness among the employees, discovery of talent and creating a brand value of the organization, to name a few. The knowledge system 106 can also be used by members of the process team disseminating knowledge. For example, the knowledge system 106 can be used by members of the process team for disseminating knowledge by automatically generating one or more mediums, say for specific topics, without manually defining contents for the mediums.

In an implementation, the knowledge system 106 hosts the knowledge framework and provides access to one or more mediums, for example, a quiz, pertinent to one or more processes. The present description has been provided with respect to quiz-based mediums for disseminating knowledge in relation to the one or more processes. However, other mediums such as tutorials, manuals, and such, would also be included within the present subject matter. For example, for an induction process, there may be various tutorials and various quizzes for different topics, such as personal skills, organizational practice, and technical skills.

In one implementation, the process team can configure the different types of mediums, initially, without any feedback from the users. The mediums can be configured, say by changing the contents of the mediums. The content can be selected by the knowledge system 106. For example, a set of questions to be included in one or more quizzes are selected by the knowledge system 106. The questions may be selected based on various parameters, such as the profile of users wishing to take the quiz, the type and the number of questions to be asked in the quiz, the theme of the quiz, the complexity of the quiz, and the topic of the quiz.

The knowledge system 106 can also include a knowledge database (not shown in the figure) available for configuring the knowledge framework. For example, knowledge system 106 can obtain questions for a quiz from the knowledge database, which in turn can store a plurality of questions. In one implementation, the knowledge system 106 selects the questions from the knowledge database based on the parameters mentioned above. In one example, the knowledge database may also include different types of questions, such as multiple-choice questions, descriptive or one word answer type, match the following, fill in the blanks, jumbled words and the like. Similarly, for other knowledge frameworks relevant knowledge databases are provided.

A theme may also be associated with one or mediums, which may indicate an objective or a nature of the mediums. The theme could be collaborative, competitive, training, entertainment, general assessment, or other such purposes. Based on the desired themes, the mediums within the knowledge framework can be adapted or configured. For example, during the early stages of deployment of a process it is desirable that the users become familiarized with the process as quickly as possible. At this stage, the knowledge system 106 may provide collaborative theme based mediums such as manuals, tutorials, etc. Similarly, in later stages of process deployment, when the proficiency of the users has to be assessed, the knowledge system 106 can provide competitive theme based mediums, such as assessment sessions or tests.

The knowledge system 106 may also be configured to allow one or more users access to interfaces supporting social exchanges, such as participation in discussion forums, user comments, user preferences, user referrals, feedback relating to the quizzes, etc. Besides providing a social platform, the knowledge system 106 is also configured to allow the users to refer one or more mediums to other users. For example, a user may refer one or more tests that the user had taken previously, to other users. Similarly, for training purposes the user may also refer manuals, articles, tutorials, etc., to other users. In this manner, a wider dissemination of knowledge can take place. The users may also refer the quizzes to users in the network 104 who are not related to a certain process, thus propagating the quiz among varied users within the network 104. This allows a non-linear propagation of knowledge and information within an organization.

Further, based on the referrals received from the users, an analysis module 108 may generate a list of additional users as recommendations. The additional users can be invited to participate in mediums and gain access to the contents included therein, thereby propagating the knowledge framework among the users. With a greater number of users, the overall knowledge base of the organization would improve.

In an implementation, the knowledge system 106 may associate a profile with one or more users. The process team may use the users' profile while configuring the knowledge framework. In one implementation, the profile may include information about the user, including name, identification, designation, seniority level, type of industry, project details, brief resume, areas of expertise, interests, subscriptions, etc. The analysis module 108, based on the profile of a user, may suggest a particular quiz to the user. Other suggestions, such as creating a group of specialists, based on the profile of the users are also within the scope of the present subject matter.

Furthermore, the knowledge system 106 also provides for interaction among a group of users, and allows the group to host their own quizzes, or other mediums, on the knowledge system 106. For example, a group of software engineers may host a quiz on software engineering on the knowledge system 106. In one implementation, the users can configure one or more parameters related to the quiz. Once the parameters are configured, the knowledge system 106 gathers the questions from the knowledge database and initiates the quiz. In an implementation, hosting/configuring may be done by the group of software engineers. The process team may assist in promoting this quiz to the users. This helps various groups of users to promote competency in their topic of interest. This feature can help enhance the competency of the employees in the organization.

The knowledge system 106 is also configured to capture feedback from the users. The feedback may be provided through the user devices 102, and sent to the knowledge system 106 via the network 104. The feedback of a particular user, for example, a user at the user device 102-1, may include performance of the user. Further, the user may also give feedback indicating a preference for a particular medium, say a quiz, referrals to other users who did not take the quiz, referrals to new people who may be included as users in a subsequent quiz, process, etc. In one implementation, the feedback captured by the knowledge system 106 can be used for supplementing the knowledge in the knowledge database. For example, based on the feedback provided for the quizzes, the number of questions, scope of topics covered, etc., can be changed by either the process team or the users themselves. Similarly, for other mediums, such as tutorials, manuals, etc., the content can be changed based on the feedback of the user. In one implementation, feedback can be gathered by the knowledge system 106 in the form of votes, rating, comments, etc.

In one implementation, the analysis module 108 receives the feedback from the users through the user devices 102. The analysis module 108 is configured to analyze the feedback. Once the analysis is complete, the analysis module 108 can propose modifications of contents of the mediums of the knowledge framework. The analysis module 108 identifies one or more users as experts in a specific field based on their performance, and may allow such expert users to recommend further modifications to the contents of the mediums within the knowledge framework. For example, the analysis module 108 may determine that a particular user is very good in a particular field, say designing computer software, and may recommend that the user be tagged as an expert in the field of computer software. The analysis module 108 may also propose that one or more expert users be requested to suggest modifications for the contents or the type of mediums within a knowledge framework specific to designing computer software. The modifications proposed by the analysis module 108 and the expert user can be used by the process team, or by the organization, for improving the effectiveness of the process deployment.

In one implementation, the knowledge system 106 can rank the users based on their profile. The ranking can be depicted as a comparison indicating the relative performance or proficiency of the user with respect to other users. Based on the ranking, the high ranking users can be recognized and/or rewarded for certain exemplary practices, such as hosting quizzes, recommending quizzes, providing feedback, promoting quizzes, moderating discussions, etc., which helps identify non-participation or deviation from accepted and standard practices.

In one implementation, the analysis module 108 may also suggest increasing level of difficulty of the quiz upon ascertaining that the participants have achieved a certain predefined level of competency. The analysis module 108 may determine the level of competency based on various criteria, such as an overall performance of all the participants, the difficulty level of the previously deployed knowledge frameworks, etc. The participants can thus proceed to participate in knowledge frameworks, such as quizzes, of complex nature.

The analysis module 108 may also provide suggestions to users based upon their feedback. In an example, the analysis module 108 may suggest a user to take a particular quiz, based upon the activities and performances of other users associated with the user. The analysis module 108 may use keywords, tags used in the quizzes, topic or category of quizzes taken by the users, users' profile, etc., to make the suggestions to the users. Such suggestions facilitate in enhancing the competency of the users in the topic to which the suggested quiz relates, thus building up the knowledge base of the organization. The suggestions can include additional quizzes, training materials, recommending experts, recommending groups, etc.

Though the systems and methods described above have been explained in relation to a particular knowledge framework, namely a quiz, it would be appreciated that the same systems and methods may be applicable to any other knowledge framework, such as a tutorial, a webinar, a trivia, a manual and the like.

Figure 2:
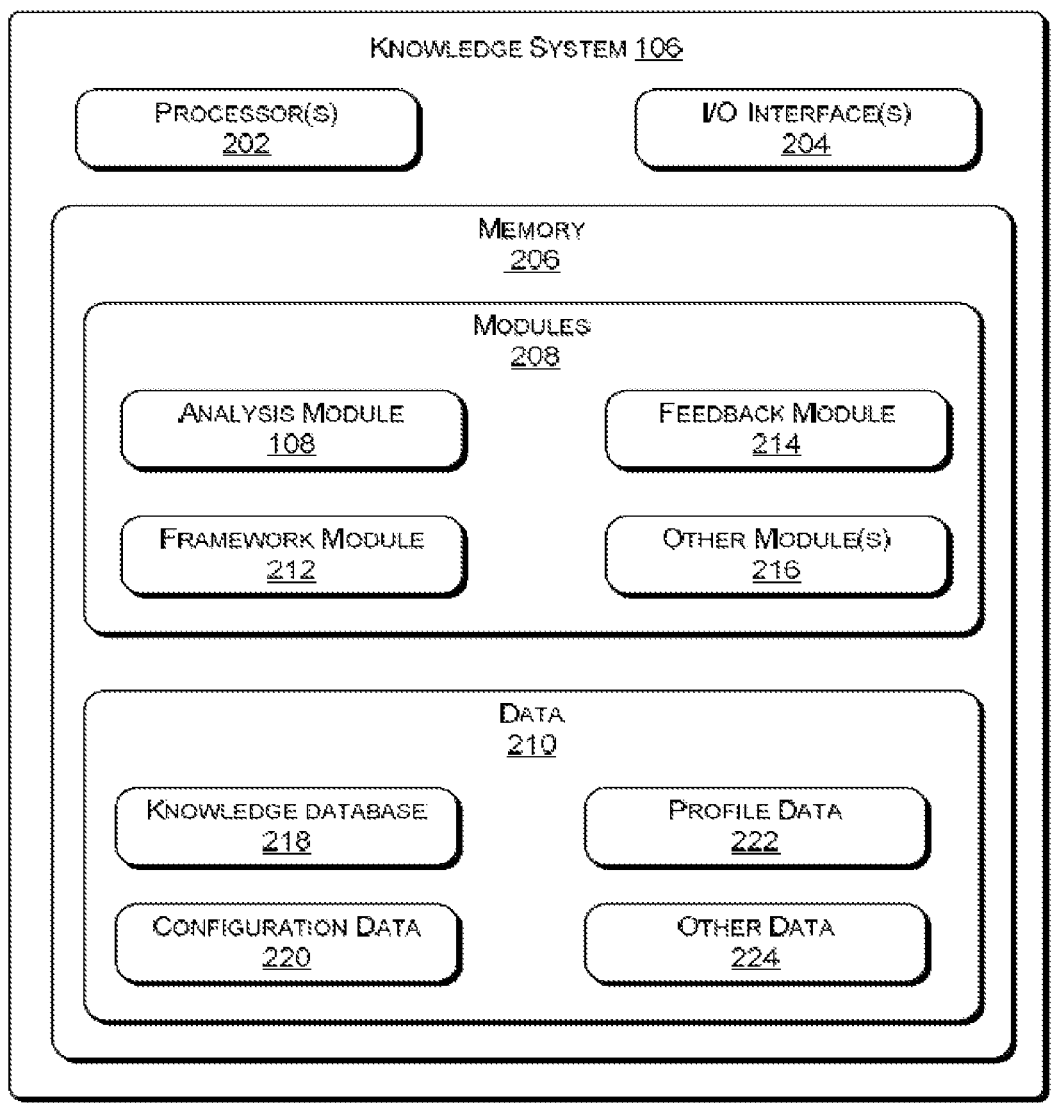
FIG. 2 illustrates exemplary components of a host device hosting a knowledge framework, according to an embodiment of the present subject matter.

The systems and devices as introduced in FIG. 1 are further described in detail in conjunction with FIG. 2. FIG. 2 illustrates exemplary components of a host device, such as the knowledge system 106, for hosting a knowledge framework, according to an embodiment of the present subject matter. The knowledge system 106 may include one or more processor(s) 202, one or more I/O interface(s) 204 and a memory 206. The processor(s) 202 may include microprocessors, microcomputers, microcontrollers, digital signal processors, central processing units, state machines, logic circuitries and/or any devices that manipulate signals and data based on operational instructions. Among other capabilities, the processor(s) 202 is configured to fetch and execute computer-readable instructions stored in the memory 206.

The I/O interface(s) 204 may include a variety of software and hardware interfaces, for example, interface for peripheral device(s) such as data input/output devices, storage devices, network devices, etc. The I/O interface(s) may include Universal Serial Bus (USB) ports, Ethernet ports, Host Bus Adaptors, etc and their corresponding device drivers. The I/O interface(s) 204, amongst other things, facilitate receipt of information by the user devices 102 from other devices in the networks 104, such as the other user devices 102, the knowledge system 106, etc.

The memory 206 can include any computer-readable medium known in the art including, for example, volatile memory (e.g., RAM) and/or non-volatile memory (e.g., flash, etc.). The memory 206 further includes modules 208 and data 210. The modules 208 include the analysis module 108, a framework module 212, a feedback module 214 and other module(s) 216. The other module(s) 216 include an operating system, or any other modules that supplement the functioning of the knowledge system 106. The data 210 serve as repositories for storing information associated with the modules 208 and any other information. In an implementation, the data 210 includes a knowledge database 218, configuration data 220, profile data 222 and other data 224.

As described above, the knowledge system 106 implements a knowledge framework pertinent to one or more processes that have been or have to be deployed within an organization. The knowledge framework may include one or more mediums, for example, quizzes, etc., which may be configured based on various parameters, such as number of users, identities of the users, type and/or number of questions, theme of the quiz, topic of the quiz, complexity associated with the quiz, users' performance in previous quizzes, users' interests and the like. For example, for the efficient and effective deployment of the induction process, there may be various tutorials and various quizzes for different topics, such as personal skills, organizational practice, and technical skills. In one implementation, the various types of mediums, for example, quizzes, are stored in the knowledge database 218.

To host a knowledge framework on the knowledge system 106, the content to be included in the type of medium is selected by the framework module 212. The contents can be selected from the knowledge database 218. The content selection can be based on the above mentioned parameters. In one implementation, the parameters can be stored in the configuration data 220. Once the content has been selected, the framework module 212 generates the medium based on the selected content. For example, the process team selects one or more parameters to configure the different types of quizzes, manuals, walkthroughs, etc. Once the type of medium, such as the quiz, is successfully configured, the framework module 212 can generate invites for one or more users, for example, users at the user devices 102, to participate in the knowledge framework. It would be appreciated that multiple quizzes can be deployed on one or more topics. Moreover, the multiple quizzes may be referred to different users. In another implementation, the framework module 212 can select the users to whom the quiz has to be referred based on the contact list associated with the referring user.

The mediums can, at a later stage, be completed either at the participating user's leisure or in a time bound manner. For example, mediums such as manuals, tutorials, etc., have to be completed within a definite period of time. The time required for completing quizzes or assessment exercises too have to be strictly observed. However, mediums such as an article on general timeliness can be read by the user at their own pace. Other informal mediums, such as fun quizzes, trivia, etc., can be completed any time or even can be ignored based on the inclination of the user.

The responses, if any, required from the user can be stored in profile data 222. Based on the responses provided by the users, the analysis module 108 can further determine the level of proficiency of the user, say of the user who had taken a quiz. For example, the analysis module 108 may categorize the users scoring a high score, or above a threshold score, to be experts in the relevant processes. In such cases, the framework module 212 may generate mediums of higher difficulty for more proficient users. Continuous good performances can increase the proficiency level of the user. In another implementation, the framework module 212 may allow the proficient users to make further modifications to the content or build mediums for users who are at a lower proficiency level. In one implementation, the profile data 222 can be stored in a database.

Similarly, for the users with a lower proficiency level, the framework module 212 may direct the users to various other types of mediums, such as tutorials, manuals, walkthroughs, training materials, groups, to further build on their concepts before they can appear for any other forms of assessment based mediums, such as quizzes or tests.

In one implementation, the analysis module 108 can rank the users based on their comparative performance. In such a case, more proficient users can be ranked high and the less proficient or recently participating users can be ranked low. Based on the ranking, the high ranking users can be recognized and/or rewarded for certain exemplary practices, such as hosting quizzes, recommending quizzes, providing feedback, promoting quizzes, moderating discussions, etc., which helps identify non-participation or deviation from accepted and standard practices.

Further, the users of the knowledge system 106 may provide their feedback on the types of mediums gone through. The feedback can be provided by the users through one or more of the user devices 102. In one implementation, the feedback module 214, on receiving feedback from the users, can store the same, either in crude form or as a summary, in profile data 222. The profile data 222 includes, in an implementation, relevant information pertaining to the user providing the feedback, such as the nature of the feedback, the user's profile information, etc. The feedback can be provided as subjective or objective inputs. For example, the user may provide feedback by selecting one of many options provided by the knowledge system 106. The user may also provide a subjective feedback by providing inputs through a text box. In such a case, the feedback provided by the user can be parsed by the analysis module 108 to glean information from the feedback provided.

A user may also provide feedback indicating a preference for a particular quiz, referrals to other users who may be included as users in a subsequent knowledge framework, etc. For example, a user's comments in a discussion forum, which is related to a topic of the quizzes not associated with the profile of the user, can be obtained by the feedback module 214. The feedback module 214 can then gather, from the feedback provided, a preference of the user for a topic. On receiving such preference, the framework module 212 can provide the users with the types of mediums selected based on their preference. For example, any user wanting to familiarize with the employment referral policies followed in an organization may forward a request for the same. On receiving such a request, the framework module 212 can provide the relevant type of medium, such as a manual or tutorial, for gaining familiarity with the topic, and then subsequently quizzes or tests, to test their proficiency in the required process. The same can be implemented for technical processes, such as the steps involved in software deployment.

Based on the feedback received by the feedback module 214, the analysis module 108 can propose modifications in the content of the mediums. The modifications can alternatively be proposed by one or more members of the process team. For example, the analysis module 108 may change the content topic of a quiz if the feedback provided indicates that the scope of the contents relates to outdated processes or technology. The contents can then be modified by one or more members of the process team.

In an implementation, a user or a group of users may collectively desire to host different types of mediums pertaining to a specific topic. The user or the group of users may consult the process team for deploying the knowledge framework. For example, during such consultations the user group wishing to host one or more mediums within the knowledge framework may provide the process team with various parameters, such as costs involved, time period for developing the mediums, personnel to be involved, etc. The analysis module 108, one receiving such parameters may determine the feasibility of deploying the mediums within the knowledge framework. If the deployment of such a knowledge framework is feasible, the user group may provide the various contents, such as questions for quizzes, technical material for manuals, tutorials, etc., in the knowledge database 218. Once the content is provided, the framework module 212 can provide the different types of mediums, such as quizzes, tutorials, etc., depending on user preference, referrals, requirement of the organization, etc.

The functionalities of the various components of the knowledge system 106 are explained below with reference to a particular process being deployed, for example, nurturing innovation. It would be appreciated that similar functionalities would be associated with the various components of the knowledge system 106 for any other process.

An organization generally has an innovation department, also referred to as a research and development (R&D) wing, to implement innovative ideas and to advance the current state of the art. The R&D wing, or an expert in the R&D wing, can host a knowledge framework for the purpose of fostering innovation and innovative thinking. The knowledge frameworks for innovation nurturing may include quizzes, puzzles, trivia, discussion forums, etc. The knowledge framework can also be used to disseminate knowledge generated in the R&D wing, promote creative thinking, promote awareness of a new technology, etc.

The present example is provided describing quizzes. However, it will be appreciated by person skilled in the art that other different types of mediums would also be included within the scope of the present subject matter. Let a knowledge framework, say a quiz, be deployed to promote creative thinking in a particular field of technology. The knowledge framework is configured by the framework module 212 based on the configuration data 220. The configuration data 220 may include parameters such as the topic, the users, the theme, the type of questions, etc. The questions to configure the knowledge framework are obtained from the knowledge database 218. The process team, or the R&D wing, may choose the type of questions to be presented. For example, the quiz may be configured to include five multiple-choice questions, five one-word answer type questions and five fill in the blanks type questions. Further, the process team may specify the users to be invited for the quiz, the theme of the quiz and other parameters. These specifications may also be stored in the configuration data 220. Based on the specifications, the framework module 212 selects the questions from the knowledge database 218 and deploys the quiz.

Figure 3:
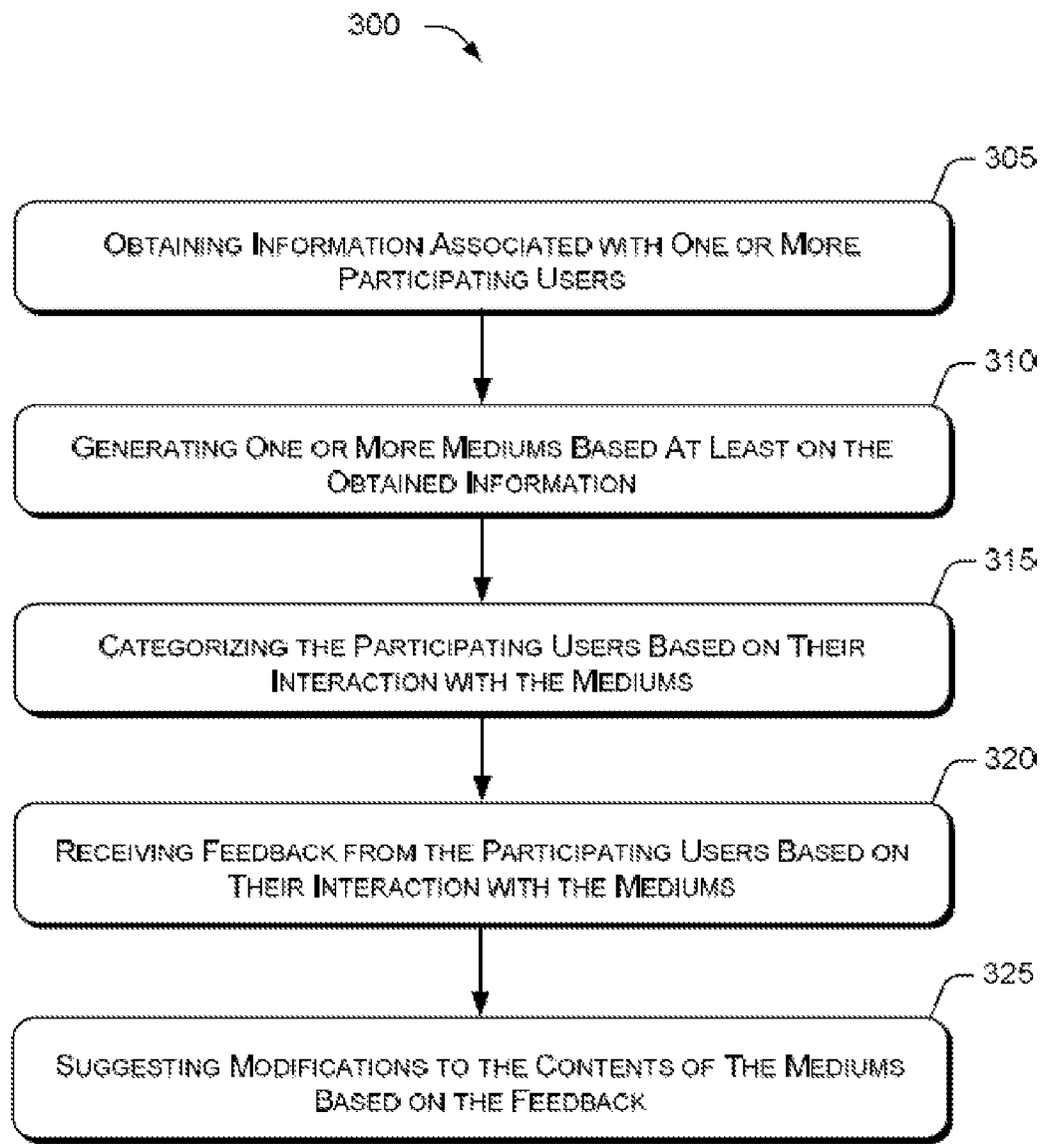
FIG. 3 illustrates an exemplary method for implementing a knowledge framework, according to an embodiment of the present subject matter.

FIG. 3 illustrates an exemplary method 300 for implementing a knowledge framework according to an embodiment of the present subject matter. These exemplary methods may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium and can be loaded or embedded in an appropriate device for execution.

The order in which the method is described is not intended to be construed as a limitation, and any number of the described method blocks can be combined in any order to implement the method, or an alternate method. Additionally, individual blocks may be deleted from the method without departing from the spirit and scope of the invention described herein. Furthermore, the method can be implemented in any suitable hardware, software, firmware, or combination thereof.

At block 305, information associated with one or more participating users interacting with the knowledge system is obtained. For example, framework module 212 gathers the information associated with one or more participating users from profile data. In one implementation, the profile may indicate various attributes of the associated users, such as the division in the organization with which the user is associated, name, identification, designation, seniority level, type of industry, project details, brief resume, areas of expertise, interests, subscriptions, interaction history on the knowledge framework, etc.

At block 310, one or more mediums are generated based on the information associated with the participating users. For example, the framework module 212 based on the information associated with the participating users may identify the topics which are of interest to the participating users. Once the topic of interest is identified, the framework module 212 selects relevant content from the knowledge database 218. In one implementation, the contents can include questions for the mediums, such as quizzes. An appropriate theme may be identified along with the medium.

At block 315, the participating users can be categorized based on their interaction with the different types of mediums. For example, for quizzes, the analysis module 108 determines the scores of the participating users. Once the scores of the participating users are obtained, the analysis module 108 ranks the participating users based on their respective scores. Higher scores, as described previously, may be indicative of higher proficiency of the participating users. Consequently, low scores could indicate that the user is probably new to the field or perhaps requires assistance for increasing their competencies, from experts in the same field.

At block 320, feedback from the participating users is received. For example, the feedback module 214 can request the participating users to provide feedback through one or more of the user devices 102. In one implementation, the feedback module 214 stores the feedback in profile data 222. The profile data 222 includes, in an implementation, relevant information pertaining to the user providing the feedback, such as the nature of feedback, the user's profile information, etc. In another implementation, the feedback can further include the performance of the participating users, say users who had taken one or more quizzes generated by the knowledge system 106.

As indicated previously, the feedback can be provided through the interface implementing a social platform enabling the participating users to interact with each other. For example, the participating users can share their performance through the interface. Similarly, the participating users can also exchange their view and their learning over forums or other such informal discussion portals, thereby allowing dissemination of information.

At block 325, based on the feedback received from the participating users, one or more modifications to the contents of the different types of mediums are suggested. For example, based on the feedback received by the feedback module 214, the analysis module 108 can propose modifications to the content of the mediums. The modifications can be for, say changing the difficulty level of the mediums. In some cases, the scope of the topics being covered can be changed, based on the feedback received by the feedback module 214. In one implementation, the contents can then be modified by one or more members of the process team.

Although embodiments for implementing a knowledge system has been described in language specific to structural features and/or methods, it is to be understood that the subject matter is not necessarily limited to the specific features or methods described. Rather, the specific features and methods are disclosed as examples of implementations for the virtualization of the plurality of storage locations.

We claim:

1. A computer implemented method for disseminating knowledge, the method comprising:
   obtaining information associated with at least one participating user;
   determining a theme for the at least one participating user from the obtained information, wherein the theme is at least one of collaborative, competitive, training, entertainment, and general assessment, and wherein the theme is indicative of one of obtaining awareness for the at least one participating user and assessing performance of the at least one participating user;
   generating at least one medium for disseminating knowledge related to an organizational process for the at least one participating user based at least in part on the obtained information and the determined theme, wherein the at least one medium is one or more of tutorials, quizzes, technical manuals, articles and presentations;
   categorizing the at least one participating user in a proficiency category based at least in part on interaction of the at least one participating user with the at least one medium, wherein the categorization indicates a level of proficiency of the at least one participating user based on comparing a proficiency score generated for the interaction to a predetermined threshold value;
   ranking, within the proficiency category, the at least one participating user with respect to other participating users by comparing the proficiency score of the at least one user with proficiency scores of the other participating users, wherein based on the ranking, high ranking users are rewarded for one or more practices including one or more of hosting quizzes, recommending quizzes, providing feedback, promoting quizzes, and moderating discussions;
   receiving feedback from the at least one participating user based on their interaction with the at least one medium, wherein the feedback comprises a preference for a particular medium, referrals to other participating users, and user comments on the content;
   analyzing the received feedback based on the interaction of the at least one participating user with the at least one medium, wherein the analyzing includes parsing the received feedback and providing suggestions to the at least one participating user, and wherein the suggestions includes one or more additional quizzes, training materials, recommending experts, or recommending groups; and
   providing modification to modifying the content of the at least one medium based at least on the received feedback analyzing and based on the categorization of the at least one participating user, wherein the modifying comprises changing difficulty level of the at least one medium and changing scope of topic covered by the at least one medium.

2. The method as claimed in claim 1, further comprising providing a network based interface allowing the at least one participating user to interact with other participating users, wherein the network based interface supports at least one of discussion forums, user comments, user preferences, user referrals, or feedback relating to the quizzes.

3. The method as claimed in claim 1, wherein the generating comprises:
   selecting, based on the obtained information, at least a part of content related to the organizational process; and
   organizing the selected content to provide the at least one medium.

4. The method as claimed in claim 3, wherein content includes a plurality of questions.

5. The method as claimed in claim 1, wherein the feedback further comprises at least one referral from the at least one participating user to at least one other participating user in a network environment.

6. A computing device implementing a knowledge system, the computing device comprising:
   a processor;
   a memory coupled to the processor, the memory comprising:
      a framework module configured to:
         obtain information from at least one participating user and determining at least one theme for the at least one participating user from the obtained information, wherein the theme is at least one of collaborative, competitive, training, entertainment, or general assessment, wherein the theme is indicative of one of obtaining awareness for the at least one participating user and assessing performance of the at least one participating user;
         generate at least one medium within a knowledge framework, where the at least one medium is configured to disseminate knowledge related to an organizational process to the at least one participating user based at least on the obtained information and the determined theme, and wherein the at least one medium is one or more of tutorials, quizzes, technical manuals, articles and presentations;
      a feedback module configured to receive feedback from the at least one participating user based on their interaction with the at least one medium, wherein the feedback comprises a preference for a particular medium, referrals to other participating users, and user comments;
      an analysis module configured to:
         categorize the at least one participating user in a proficiency category based at least in part on interaction of the at least one participating user with the at least one medium, wherein the categorization indicates a level of proficiency of the at least one participating user based on comparing a proficiency score generated for the interaction to a predetermined threshold value;
         rank, within the proficiency category, the at least one participating user with respect to other participating users by comparing the proficiency score of the at least one user with proficiency scores of the other participating users, wherein based on the ranking, high ranking users are rewarded for one or more practices including one or more of hosting quizzes, recommending quizzes, providing feedback, promoting quizzes, and moderating discussions;
         perform analysis of the received feedback based on the interaction of the at least one participating user with the at least one medium, wherein the analysis includes parsing the received feedback and provides suggestions to the at least one participating user, and wherein the suggestions includes one or more additional quizzes, training materials, recommending experts, or recommending groups; and recommend proposed modifications for content of the at least one medium based at least on the analysis, and based on the categorization of the at least one participating user, wherein the proposed modification further comprises, changing difficulty level of the at least one medium, and changing scope of topic covered by the at least one medium.

7. The computing device as claimed in claim 6, further comprising a feedback module configured to acquire the feedback from the at least one participating user.

8. The computing device as claimed in claim 6, wherein the framework module is further configured to modify the knowledge framework based at least on the modifications proposed by the analysis module.

9. The computing device as claimed in claim 6, wherein the framework module is configured to provide an interface for the at least one participating user for interacting with other participating users interacting with other mediums.

10. The computing device as claimed in claim 6, wherein the framework module is configured to select the content from a knowledge database.

11. The computing device as claimed in claim 10, wherein the framework module selects the content based on information associated with the at least one participating user.

12. A non-transitory computer readable medium having computer executable instructions which when executed, implement a method comprising:

obtaining information associated with at least one participating user;

determining a theme of the at least one participating user from the obtained information, wherein the theme is at least one of collaborative, competitive, training, entertainment, general assessment, wherein the theme is indicative of one of obtaining awareness for the at least one participating user and assessing performance of the at least one participating user;

generating at least one medium for disseminating knowledge related to an organizational process for at least one participating user based at least in part on information associated with the at least one participating user, wherein the at least one medium is one or more of tutorials, quizzes, technical manuals, articles and presentations;

categorizing the at least one participating user in a proficiency category based at least in part on interaction of the at least one participating user with the at least one medium, wherein the categorization indicates a level of proficiency of the at least one participating user based on comparing a proficiency score generated for the interaction to a predetermined threshold value;

ranking, within the proficiency category, the at least one participating user with respect to other participating users by comparing the proficiency score of the at least one user with proficiency scores of the other participating users, wherein based on the ranking, high ranking users are rewarded for one or more practices including one or more of hosting quizzes, recommending quizzes, providing feedback, promoting quizzes, and moderating discussions;

receiving feedback from the at least one participating user based on their interaction with the at least one medium, wherein the feedback comprises a preference for a particular medium, referrals to other participating users, and user comments;

analyzing the received feedback based on the interaction of the at least one participating user with the at least one medium, wherein the analyzing includes parsing the received feedback and providing suggestions to the at least one participating user, and wherein the suggestions includes one or more additional quizzes, training materials, recommending experts, or recommending groups; and modifying the content of the at least one medium based at least on the received feedback analyzing and based on the categorization of the at least one participating user, wherein the modifying comprises changing difficulty level of the at least one medium and changing scope of topic covered by the at least one medium.

13. The non-transitory computer readable medium as claimed in claim 12, wherein the generating comprises:

selecting, based on the information, at least a part of content related to the organizational process; and organizing the selected content to provide the at least one medium.

14. The non-transitory computer readable medium as claimed in claim 12, wherein the feedback comprises at least one referral from the at least one participating user to at least one other participating user in a network environment.

* * * * *